US011044618B2

(12) United States Patent
Cui et al.

(10) Patent No.: US 11,044,618 B2
(45) Date of Patent: Jun. 22, 2021

(54) FACILITATING AUTOMATIC LATENCY DISCOVERY AND DYNAMIC NETWORK SELECTION USING DATA ANALYTICS IN ADVANCED NETWORKS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Hongyan Lei, Plano, TX (US); Sangar Dowlatkhah, Plano, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 132 days.

(21) Appl. No.: 16/388,074

(22) Filed: Apr. 18, 2019

(65) Prior Publication Data
US 2020/0336926 A1    Oct. 22, 2020

(51) Int. Cl.
*H04W 24/08* (2009.01)
*H04L 12/26* (2006.01)
*H04W 84/04* (2009.01)
*H04W 48/14* (2009.01)
*H04W 24/02* (2009.01)
*H04W 76/00* (2018.01)
*H04W 24/06* (2009.01)

(52) U.S. Cl.
CPC ......... *H04W 24/08* (2013.01); *H04L 43/0858* (2013.01); *H04L 43/10* (2013.01); *H04L 43/16* (2013.01); *H04W 84/042* (2013.01)

(58) Field of Classification Search
None
See application file for complete search history.

(56) References Cited

U.S. PATENT DOCUMENTS

| 9,088,930 B1* | 7/2015 | Negeri ................. H04W 48/18 |
| 9,949,272 B2 | 4/2018 | Jeon et al. |
| 2014/0043992 A1* | 2/2014 | Le Pallec ............ H04L 43/0852 370/252 |
| 2015/0087307 A1* | 3/2015 | Cui ....................... H04W 4/025 455/436 |
| 2016/0219088 A1* | 7/2016 | Ma ...................... H04L 65/4069 |
| 2017/0118128 A1 | 4/2017 | Vishnoi et al. |
| 2017/0223062 A1* | 8/2017 | Jing ................... H04L 43/0852 |

(Continued)

FOREIGN PATENT DOCUMENTS

CN          104219076 A     12/2014

*Primary Examiner* — Jay L Vogel
(74) *Attorney, Agent, or Firm* — Amin, Turocy & Watson, LLP

(57) ABSTRACT

Facilitating automatic latency discovery and dynamic network selection using data analytics in advanced networks (e.g., 4G, 5G, 6G, and beyond) is provided herein. Operations of a method can comprise inserting, by a system comprising a processor, first information indicative of a first identified time into a first field of a message. Also, the method can comprise transmitting, by the system, the message to a defined device. Further, the method can comprise determining, by the system, an end-to-end latency for the message based on a response received from the defined device in reply to the message. The response can comprise second information indicative of a second identified time that the message was received at the defined device.

20 Claims, 10 Drawing Sheets

(56) References Cited

U.S. PATENT DOCUMENTS

| | | |
|---|---|---|
| 2017/0332316 A1* | 11/2017 | Itatsu ................. H04L 43/0852 |
| 2018/0006935 A1 | 1/2018 | Mutnuru et al. |
| 2018/0020324 A1* | 1/2018 | Beauford ................ H04L 43/10 |
| 2018/0316608 A1 | 11/2018 | Dowlatkhah et al. |
| 2018/0316615 A1 | 11/2018 | Shaw et al. |
| 2018/0316779 A1 | 11/2018 | Dowlatkhah et al. |
| 2018/0324106 A1 | 11/2018 | Billore et al. |
| 2018/0352498 A1 | 12/2018 | Reisslein et al. |
| 2019/0098684 A1* | 3/2019 | Tamura ................. H04W 88/10 |
| 2019/0215731 A1* | 7/2019 | Qiao .................... H04L 43/087 |
| 2020/0204603 A1* | 6/2020 | Upadhyaya ......... H04L 65/4076 |

* cited by examiner

| TYPE 202 | CODE 204 | CHECKSUM 206 |
|---|---|---|
| ID NUMBER 208 | | UNUSED 210 |
| OUTBOUND HOP COUNT 212 | | RETURN HOP COUNT 214 |
| OUTPUT LINK SPEED 216 | | |

FIG. 2

FACILITATING AUTOMATIC LATENCY DISCOVERY AND DYNAMIC NETWORK SELECTION USING DATA ANALYTICS IN ADVANCED NETWORKS

TECHNICAL FIELD

This disclosure relates generally to the field of mobile communication and, more specifically, to facilitating automatic latency discovery and dynamic network selection in advanced networks (e.g., 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, and/or other next generation, standards for wireless communication.

BRIEF DESCRIPTION OF THE DRAWINGS

Various non-limiting embodiments are further described with reference to the accompanying drawings in which:

FIG. 2 illustrates an example, non-limiting, message format for a traditional internet control message protocol echo message according to an aspect;

DETAILED DESCRIPTION

Figure 1:
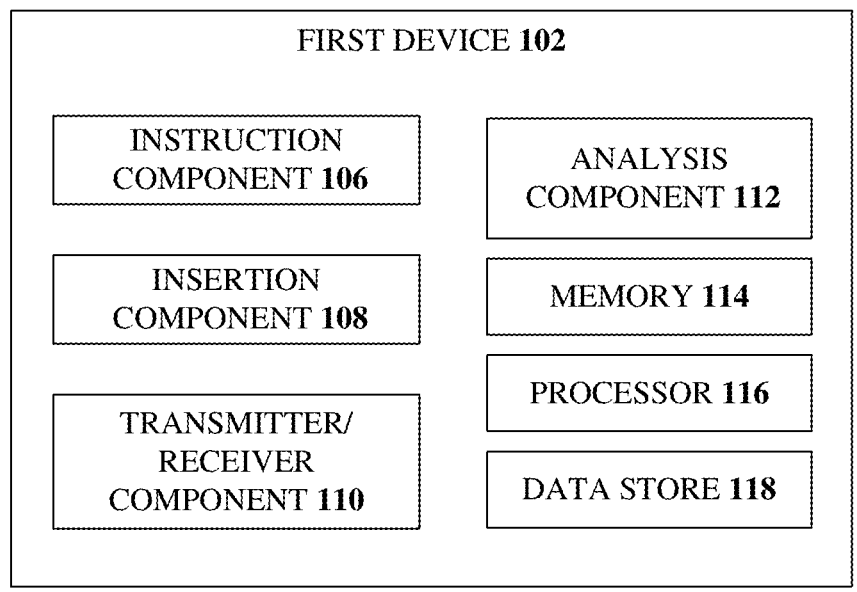
FIG. 1 illustrates an example, non-limiting, system for automatic latency discovery and dynamic network selection using data analytics in advanced networks in accordance with one or more embodiments described herein.
Figure 1:
Figure 1:
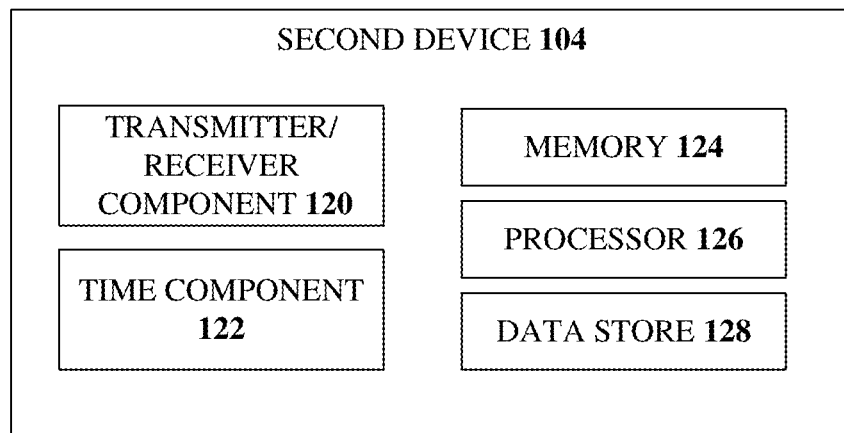

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate automatic latency discovery and dynamic network selection in advanced networks. To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t,N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 6G network can be configured to provide more bandwidth than the bandwidth available in other networks (e.g., 4G network, 5G network), a 6G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 6G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Further, a 6G network can integrate a number of access technologies to create universal coverage and always-on broadband global network. For example, a 6G network can include more integrated terrestrial wireless with satellite systems in the access network.

When a user (e.g., a subscriber) initiates, such as via a User Equipment (UE) device, a session to setup a service there could be at least two conditions. For example, a first condition can be that an access controller already knows the best possible route and access technology to employ for that specific requested service. The a priori knowledge about the route and access technology can be based on previous (e.g., historical) measurements and parameters. Such measurements and/or parameters can include the latency, type of service, Quality of Service (QoS), and others.

In another example, the second condition can be that the newly initiated session could have certain parameters that have not been measured recently. Therefore, these parameters need to be re-measured while setting up the session in order to choose the best possible technology and routes needed for the new requested service (e.g., with required new parameters). For the second condition, the disclosed aspects can provide a solution to measure and/or estimate the end-to-end performance. For example, the latency, across various access technologies (e.g. LTE, 5G, WiFi, Wireline, and satellite, and so forth).

Based on the end-to-end performance of different access technologies and the application requirements, a network device (e.g., a Software-Defined Network (SDN) controller) can chooses the most suitable access technology for a given application service delivery in a communication network (e.g., a 5G network, a 6G network, and so on).

Each access technology can further have associated weights and/or costs that can be used as inputs in the access technology/slice selection decision to maximize the resource efficiency. Data analytics can continue to learn the network conditions to allow the network device (e.g., the SDN controller) to make the best decision on what access technology/core/transport and which slice within the network to use and how to route within the network to deliver services to the end user based on the application requirements, end-to-end latencies, cost, and other criteria.

According to an embodiment, provided is a system that can comprise a processor and a memory that stores executable instructions that, when executed by the processor, facilitate performance of operations. The operations can comprise facilitating a transmission of a traceroute echo packet to a device via a defined radio access technology. The operations also can comprise, based on a reply received in response to the transmission of the traceroute echo packet, determining a total latency of the traceroute echo packet.

In accordance with some implementations, the traceroute echo packet can comprise a first timestamp field and a second timestamp field. The first timestamp field can comprise first information indicative of a first time of the transmission of the traceroute echo packet. The second timestamp field can comprise second information indicative of a second time of receipt of the traceroute echo packet at the device. Further to these implementations, determining the total latency can comprise determining the total latency based on the first timestamp field, the second timestamp field, and a time associated with receipt of the reply.

According to an example, the total latency can comprise an end-to-end delay measured for a downlink transmission and an uplink transmission. In an additional, or alternative, example, the traceroute echo packet can comprise a radio access technology field that can comprise third information indicative of a defined access technology over which the total latency is measured. Further to this example, the operations can comprise comparing the total latency with a service latency threshold and using the defined access technology based on the total latency satisfying the service latency threshold. Alternatively, the operations can comprise comparing the total latency with a service latency threshold and changing an access technology from the defined access technology to a different access technology based on the total latency failing to satisfy the service latency threshold.

In accordance with some implementations, facilitating the transmission of the traceroute echo packet can comprise facilitating the transmission of the traceroute echo packet via a downlink channel configured to operate according to a fifth generation wireless network communication protocol. Alternatively, facilitating the transmission of the traceroute echo packet can comprise facilitating the transmission of the traceroute echo packet via an uplink channel configured to operate according to a fifth generation wireless network communication protocol.

Another embodiment can relate to a method that can comprise inserting, by a system comprising a processor, first information indicative of a first identified time into a first field of a message. Also, the method can comprise transmitting, by the system, the message to a specified device. Further, the method can comprise determining, by the system, an end-to-end latency for the message based on a response received from the specified device in reply to the message. The response can comprise second information indicative of a second identified time that the message was received at the specified device.

The method can comprise, according to some implementations, determining, by the system, a downlink latency based on a difference between the second identified time and the first identified time. Further, in some implementations, the method can comprise determining, by the system, an uplink latency based on a difference between a received time of the reply and the second identified time.

According to some implementations, the method can comprise including, by the system, a radio access technology field in the message. The radio access technology field can comprise information related to a defined access technology over which the end-to-end latency is measured. Further to these implementations, the method can comprise comparing, by the system, the end-to-end latency with a latency threshold and using, by the system, the defined access technology based on the end-to-end latency satisfying the latency threshold. Alternatively, the method can comprise comparing, by the system, the end-to-end latency with a latency threshold and using, by the system, another access technology, other than the defined access technology, for communication with the specified device based on the end-to-end latency failing to satisfy the latency threshold.

According to some implementations, transmitting the message to the specified device can comprise transmitting the message via a downlink channel configured to operate according to a fifth generation wireless network communication protocol. Alternatively, transmitting the message to the specified device can comprise transmitting the message via an uplink channel configured to operate according to a fifth generation wireless network communication protocol.

Another embodiment can relate to a machine-readable storage medium, comprising executable instructions that, when executed by a processor, facilitate performance of operations. The operations can comprise conveying a traceroute echo packet to a device via a defined radio access technology. Also, the operations can comprise, based on a reply received in response to the transmission of the traceroute echo packet, determining a total latency of the traceroute echo packet. The total latency can comprise a first time for transmission to the device and a second time for transmission from the device. Further, the first time for transmission and the second time for transmission can be different times.

In accordance with some implementations, the operations can comprise comparing the total latency with a defined latency threshold and using the defined radio access technology based on the total latency satisfying the defined latency threshold. According to other implementations, the operations can comprise comparing the total latency with a defined latency threshold and using another radio access technology, other than the defined radio access technology, for communication with the device based on the total latency failing to satisfy the defined latency threshold.

Referring initially to FIG. 1, illustrated is an example, non-limiting, system 100 for automatic latency discovery and dynamic network selection using data analytics in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a first device 102 and a second device 104. According to some implementations, the second device 104 can be a testing device, which can be associated with a network operator, or another entity that performs one or more testing functions. According to some implementations, the second device 104 can be a User Equipment device. Further, the first device 102 can be a network device included in a group of network devices of a wireless network. According to some implementations, the first device 102 can be an SDN controller. The first device 102 can comprise one or more of the components and/or functionality of the second device 104, and vice versa.

Although only two devices are shown and described, the various aspects are not limited to this implementation. Instead, multiple devices can be included in a communications system. Further, although the second device 104 is discussed with respect to a user equipment device and the first device 102 is discussed with respect to a network device, the disclosed aspects are not limited to these implementations. Instead, the second device could be a network device and the first device could be a user equipment device.

The first device 102 can include an instruction component 106, an insertion component 108, a transmitter/receiver component 110, and an analysis component 112, at least one memory 114, at least one processor 116, and at least one data store 118. The second device 104 can include a transmitter/receiver component 120, a timer component 122, at least one memory 124, at least one processor 126, and at least one data store 128.

The instruction component 106 can provide an instruction to send one or more Internet Control Message Protocol (ICMP) traceroute echo packets to the second device 104. According to some implementations, the instruction can be for a dedicated server/router to send the one or more ICMP traceroute echo packets to the second device 104. The instruction can include a specific access, backhaul, and core that the traceroute echo packets should traverse. According to some implementations, the one or more ICMP traceroute echo packets can be sent to two or more devices. However, in some implementations, different ICMP traceroute echo packets can be sent to different devices. For example, a first ICMP traceroute echo packet can be sent to a first device, a second ICMP traceroute echo packet can be sent to a second device, a third ICMP traceroute echo packet can be sent to a third device, and so on.

The one or more traceroute echo packets can comprise fields that facilitate automatic latency discovery and dynamic network selection using data analytics as discussed herein. For example, FIG. 2 illustrates an example, non-limiting, message format 200 for a traditional ICMP echo message according to an aspect. When an ICMP echo message is sent that includes a traceroute option, the receiving device (e.g., the second device 104) is instructed to send an ICMP Traceroute message to the originator of the message (e.g., the first device 102). The origination or the message can be determined by an originator IP address field in the message.

According to some implementations, the message format 200 can be as defined per RFC 1393. For example, as illustrated the message format 200 can include various fields. A first field 202 can be for a type field. The type field can be, for example, eight bits. According to some implementations, the type field can identify a protocol type.

A second field 204 can be a code field, which can be eight bits, for example. A third field 206 can be a checksum field. For example, the field can be for a header checksum and can be sixteen bits in length. For computing the checksum, the checksum field should initially be set to 0. For transmission of the data packet, the checksum can be computed and inserted into the third field 206. When the data packet is received, the checksum can be re-computed and compared to the third field 206. If the two checksums do not match, it can indicate an error.

A fourth field 208 can be an identifier (ID) number field, which can be sixteen bits in length. The fourth field 208 can include the ID Number as copied from the ICMP traceroute option of the packet which caused the traceroute message to be sent. This is not related to the ID number in the IP header.

A fifth field 210 can be unused can be sixteen bits in length.

A sixth field 212 can be an outbound hop count field, which can be sixteen bits, for example. The outbound hop count can be copied from the IP traceroute option of the packet which caused the traceroute message to be sent. A seventh field 214 can be a return hop count field. This field can be sixteen bits. The return hop count can be copied from the IP traceroute option of the packet which caused the traceroute message to be sent.

Further, an eighth field 216 can be an output link speed field. The eighth field 216 can be thirty-two bits. This field can identify the speed in bytes per second of the link over which the outbound/return packet will be sent. If this cannot be determined, the eighth field 216 can be set to zero.

Figure 3:
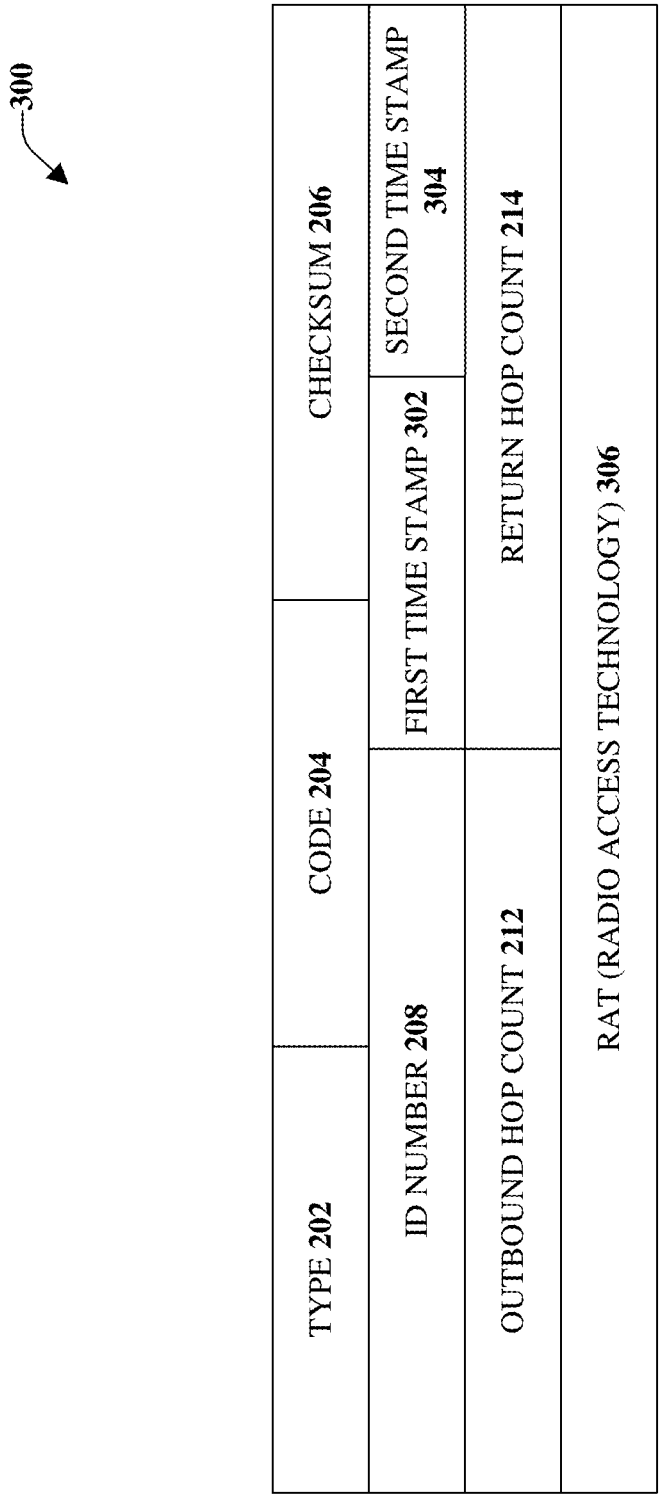
FIG. 3 illustrates a message format for an enhanced internet control message protocol internet control message protocol traceroute message in accordance with one or more embodiments described herein.

It is noted that the message format 200 of the traditional ICMP echo message is not sufficient to sample the actual latency. Accordingly, FIG. 3 illustrates a message format 300 for an enhanced ICMP traceroute message in accordance with one or more embodiments described herein. Repetitive description of like elements employed in other embodiments described herein is omitted for sake of brevity.

The message format 300 for the enhanced ICMP Traceroute message can be formatted by the insertion component 108 according to various aspects. For example, newly added fields can include a first timestamp field 302, a second timestamp field 304, and a Radio Access Technology field (or RAT field 306).

The first timestamp field 302 can be marked (e.g., a first time inserted into the field) by the insertion component 108 (e.g., the ICMP echo packet originator, which can be the first device 102, or a dedicated server/router). The second timestamp field 304 can be marked (e.g., a second time inserted into the field) by the second device 104 (e.g., the timer component 122). Further, before or at the time the ICMP echo packet is put on the wireless link (e.g., 5G, 6G, LTE, Wi-Fi, satellite, and so on), the RAT field can be marked (e.g., by the insertion component 108) to distinguish or identify the access technology over which the end-to-end delay is measured.

The transmitter/receiver component 110 can send the one or more traceroute echo packets 132 to the second device 104 via the specific access, backhaul, and core. The echo packets can instruct (or cause) the second device 104 to send the ICMP traceroute message back to the originator of the ICMP Echo packet (e.g., the first device 102). When the ICMP echo packet originator (e.g., the first device 102 or a dedicated server/router) receives the returned echo packet (e.g., via the transmitter/receiver component 110), the analysis component 112 can compare the first timestamp, the second timestamp, and its current time (e.g., the time of receipt of the return message). Based on this comparison, the analysis component 112 can derive the end-to-end latency for an uplink transmission and/or a downlink transmission. For example, the analysis component 112 can determine if the end-to-end latency for the uplink and/or the downlink satisfies a defined latency threshold.

If the determination by the analysis component is that the end-to-end latency satisfies the defined latency threshold, the first device 102 (or another device) can use the radio access technology defined in the message (e.g., the radio access technology for which the total latency was determined) for service to the second device 104 or to another device.

Alternatively, if the determination by the analysis component 112 is that the end-to-end latency does not satisfy the latency threshold, the first device 102 (or another device) can use another radio access technology, other than the defined radio access technology, for communication with the second device 104, or communication with another device that comprises similar latency requirements.

The transmitter/receiver component 110 can be configured to transmit to, and/or receive data from, the second device 104, other network devices, and/or other UE devices. Through the transmitter/receiver component 110, the first device 102 can concurrently transmit and receive data, can transmit and receive data at different times, or combinations thereof. Further, the transmitter/receiver component 120 can be configured to transmit to, and/or receive data from, the first device 102, other UE devices, and/or other network devices. Through the transmitter/receiver component 120, the second device 104 can concurrently transmit and receive data, can transmit and receive data at different times, or combinations thereof.

The at least one memory 114 can be operatively connected to the at least one processor 116. The at least one memory 114 can store executable instructions that, when executed by the at least one processor 116 can facilitate performance of operations. Further, the at least one processor 116 can be utilized to execute computer executable components stored in the at least one memory 114 and/or the at least one data store 118.

For example, the at least one memory 114 can store protocols associated with facilitating automatic latency discovery and dynamic network selection using data analytics in advanced networks as discussed herein. Further, the at least one memory 114 can facilitate action to control communication between the first device 102, the second device 104, other network devices, and/or other UE devices, such that the first device 102 can employ stored protocols and/or algorithms to achieve improved communications in a wireless network as described herein.

Further, the at least one memory 124 can be operatively connected to the at least one processor 126. The at least one memory 124 can store executable instructions that, when executed by the at least one processor 126 can facilitate performance of operations. Further, the at least one processor 126 can be utilized to execute computer executable components stored in the at least one memory 124 and/or the at least one data store 128.

For example, the at least one memory 124 can store protocols associated with automatic latency discovery and dynamic network selection using data analytics in advanced networks as discussed herein. Further, the at least one memory 124 can facilitate action to control communication between the second device 104, the first device 102, other UE devices, and/or other network devices, such that the second device 104 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 116 can facilitate respective analysis of information related to automatic latency discovery and dynamic network selection using data analytics in advanced networks. The at least one processor 116 can be a processor dedicated to analyzing and/or generating information received, a processor that controls one or more components of the first device 102, and/or a processor that both analyzes and generates information received and controls one or more components of the first device 102.

In addition, the at least one processor 126 can facilitate respective analysis of information related to automatic latency discovery and dynamic network selection using data analytics in advanced networks. The at least one processor 126 can be a processor dedicated to analyzing and/or generating information received, a processor that controls one or more components of the second device 104, and/or a processor that both analyzes and generates information received and controls one or more components of the second device 104.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 4:
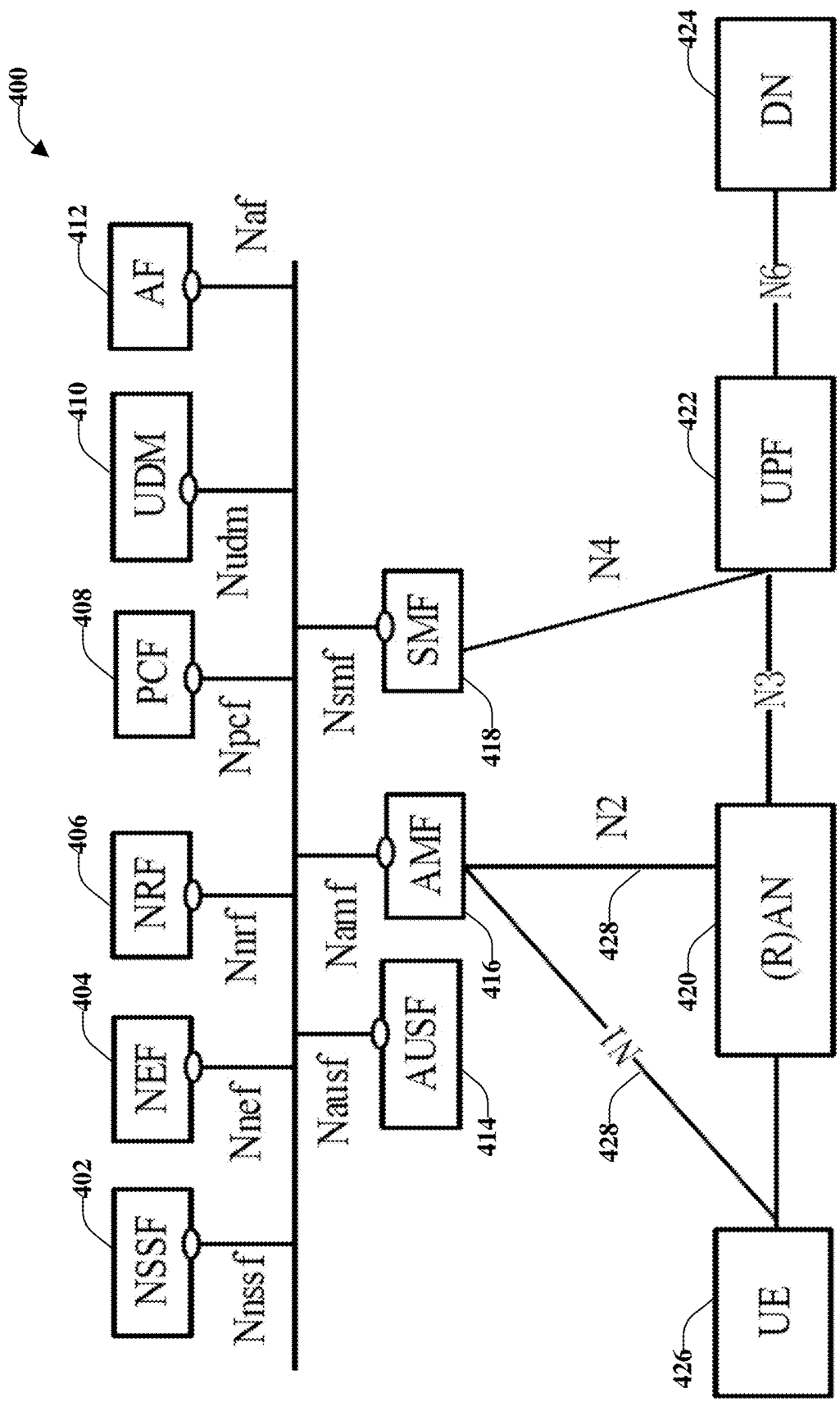
FIG. 4 illustrates an example, non-limiting, high level system architecture for an advanced network, in accordance with one or more embodiments described herein.

FIG. 4 illustrates an example, non-limiting, high level system architecture 400 for an advanced network, in accordance with one or more embodiments described herein. The high level system architecture 400 can comprise various Network Functions (NF). These network functions include, but are not limited to, a Network Slice Selection Function (NSSF) 402, a Network Exposure Function (NEF) 404, a Network Repository Function (NRF) 406, a Policy Control Function (PCF) 408, a Unified Data Management (UDM) 410, an Application Function (AF) 412, an Authentication Server Function (AUSF) 414, an Access and Mobility Management Function (AMF) 416, a Session Management Function (SMF) 418, a (Radio) Access Network ((R)AN) 420, a User Plane Function (UPF) 422, a Data Network (DN) 424 (e.g. operator services, Internet access, third party services), and one or more UEs 426. In the example of FIG. 4, service-based interfaces can be used within a control plane.

The enhanced ICMP traceroute message (e.g., the message format 300) can be used over an N1 interface 428 and an N2 interface 430, which can enable automatic detection of the latency between UE and core control plane, and between RAN node and core control plane. For example, if N1 stamp/echo, the delay derived is between UE and core on the control plane. In another example, if N2 stamp/echo, the delay derived is between RAN node and core on the control plane. It is noted that other performance parameters, such as jitter, is also possible.

For example, if information about the control plane latency is desired, a message can be sent between a UE of the one or more UEs 426 and the AMF 416, which is the control plane component over the N1 interface 428. Additionally, or alternatively, a message can be sent between the RAN 420 and the AMF 416, which is information about the control plane latency (e.g., over the N2 interface 430).

These detailed latency information on the network segment can provide controller more information to make better decisions. For example, the control plane and user plane latency for each access technology can further have associated weights/cost that can be used as inputs in the access technology/slice selection decision to maximize the resource efficiency. Data analytics can continue to learn the network conditions to allow the SDN controller (or another system component) to make the best decision.

According to some implementations, as discussed herein a new AMF capability can be added. AMF can provide core control function for access and mobility function. Further, according to some implementations, there can be APIs for the UE or the RAN node to report the discovered user plane and control plane estimated latencies for each RAT.

The automatic detected network performance can be used as input parameters to the SDN control for the dynamic selection of the most proper radio technology and transport path to deliver the end user services based on latency to optimize network performance.

Accordingly, the various aspects discussed herein can be configured to add new echo/stamp messages/information elements (IEs) between a dedicated server/router, and on N1 and N2 interface to enable automatic detection of the end-to-end latency, and between UE and core, and between RAN node and core on the control plane. An enhanced ICMP traceroute message, as discussed herein, can be used to estimate the end user latency performance. The automatic detected network performance can be used as key input parameters to the SDN controller (or another system component) for the dynamic selection of the most proper radio technology and transport network to deliver the end user services based on latency to optimize network performance.

Advantages of the various embodiments include, but are not limited to, automatic accurate and real time latency detection. Another advantage includes dynamic intelligent RAT selection for user applications based on network performance A further advantage relates to dynamic intelligent transport path selection for user applications based on network performance Yet another advantage is improved network performance and user experience. A further advantage relates to optimize network resource utilization and reduced network operation cost.

It is noted that although discussed with respect to 5G, the disclosed aspects can be extended to other technologies beyond 5G. For example, 6G integrates a number of access technologies to create universal coverage and always-on broadband global network, including, for example, more integrated terrestrial wireless with satellite systems in the access network. As discussed herein, provided is a latency discovery mechanism using enhanced "traceroute" to estimate the user plane latency performance between the UE (or other device) and application server across various access technologies (e.g. LTE, 5G, WiFi, Wireline, and satellite).

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
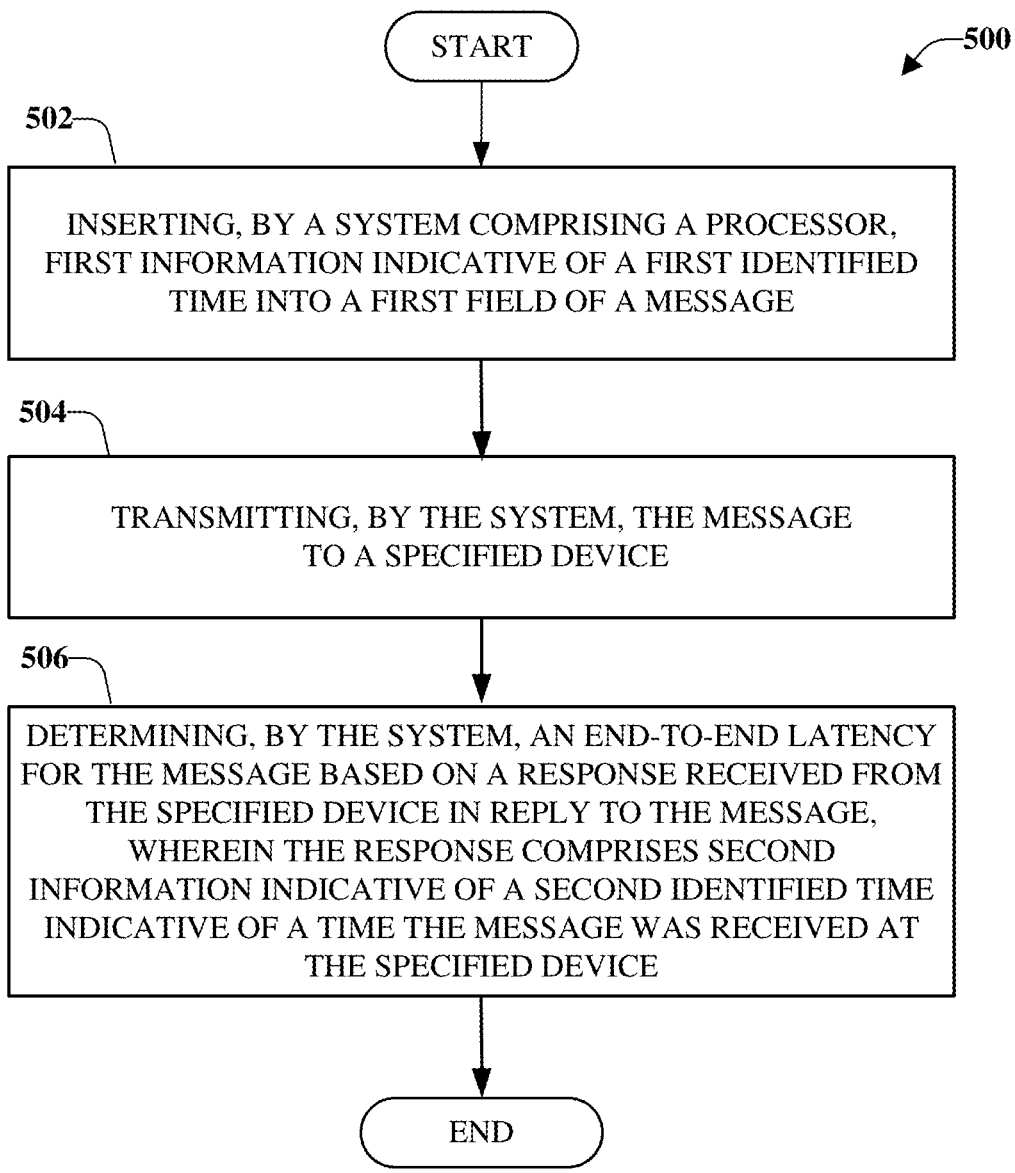
FIG. 5 illustrates a flow diagram of an example, non-limiting, computer-implemented method for facilitating automatic latency discovery and dynamic network selection in advanced networks in accordance with one or more embodiments described herein.

FIG. 5 illustrates a flow diagram of an example, non-limiting, computer-implemented method 500 for facilitating automatic latency discovery and dynamic network selection in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a system comprising a processor can insert first information indicative of a first identified time into a first field of a message (e.g., via the insertion component 108). The first identified time can be a time that a message is being sent to a device. According to some implementations, the system can be a network device. For example, the device can be an SDN controller. In another example, the system can be a dedicated server. In accordance with some implementations, the system can be an end device. For example, the device can be a test device. In another example, the system can be a UE device.

The message can be transmitted to a specified device, at 504 (e.g., via the transmitter/receiver component 110). In an example, transmission of the message can be over a defined radio access technology. According to some implementations, the message can comprise a radio access technology field that includes information indicative of the defined radio access technology.

Further, at 506 of the computer-implemented method 500, the system can determine an end-to-end latency for the message based on a response received from the specified device in reply to the message (e.g., via the analysis component 112). The response can comprise second information indicative of a second identified time that the message was received at the specified device. In an example, if the message comprises a radio access technology field, the radio access field can comprise information related to a defined access technology over which the end-to-end latency is measured.

According to some implementations, the system can determine an uplink latency based on a difference between a received time of the reply and the second identified time. Alternatively, or additionally, in some implementations, the system can determine a downlink latency based on a difference between a received time of the reply and the second identified time.

The first time for a transmission via a downlink and the second time for transmission via an uplink can be different times (e.g., are not symmetric). For example, the downlink might use a first route and the uplink might use a second route. In an example, the first route can be via satellite and the second route can be via a cellular link.

By way of example and not limitation, the defined threshold can be based on a service level agreement (e.g., between a network provider and a user). In another example, the defined threshold can be based on the type of service being provided (e.g., video, gaming, voice, and so on). Further, in some implementations, the defined threshold can be based on a current situation. For example, a defined threshold for transmission to various devices for emergency services or first responders can have a low latency (e.g., quicker) as compared to the transmission for other devices (e.g., end user streaming a video). In addition, the latency can be impacted by various conditions, including, for example, weather conditions.

Figure 6:
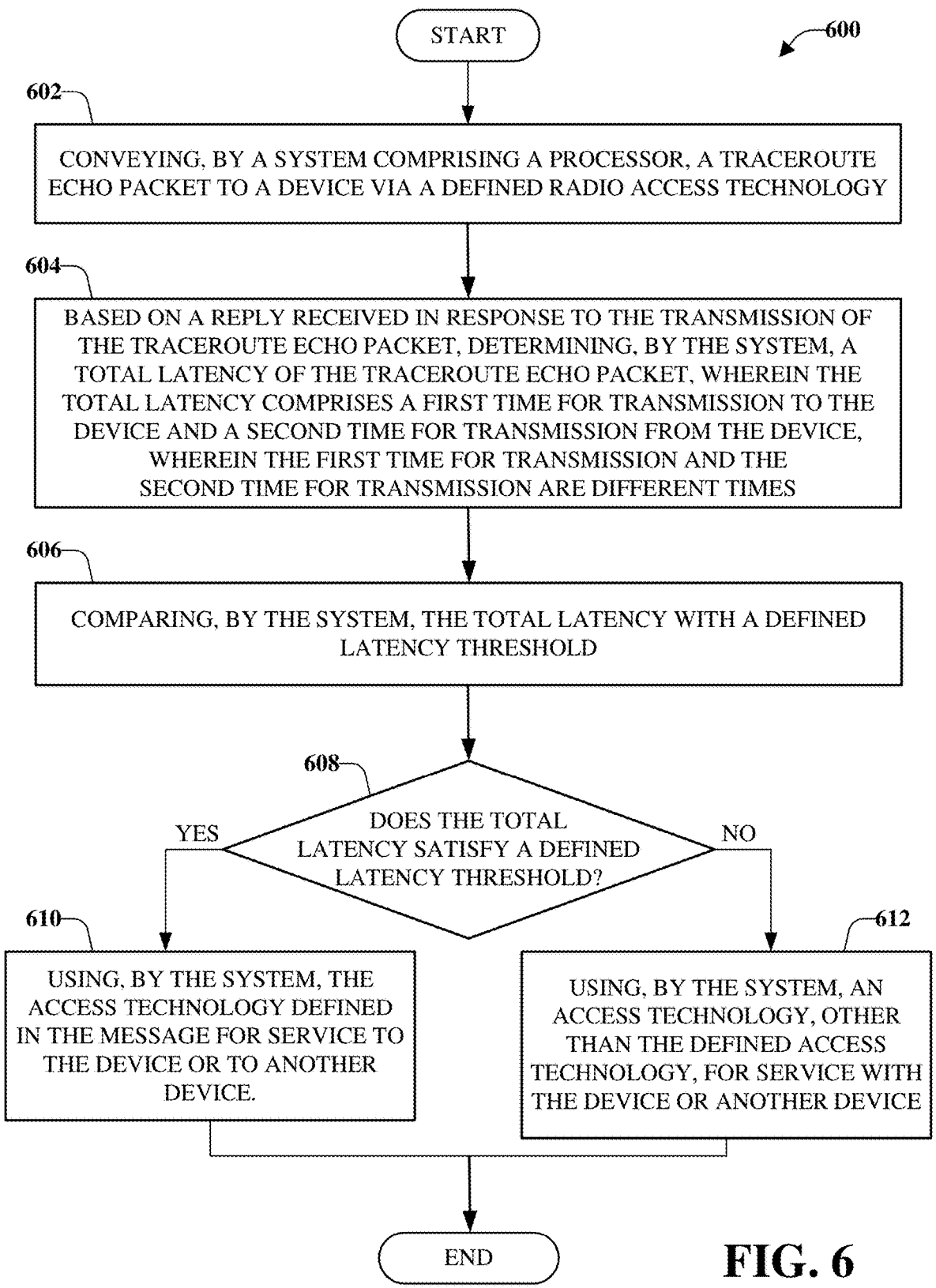
FIG. 6 illustrates a flow diagram of an example, non-limiting, computer-implemented method for changing one or more parameters related to transmission of information based on automatic latency discovery and dynamic network selection in advanced networks in accordance with one or more embodiments described herein.

FIG. 6 illustrates a flow diagram of an example, non-limiting, computer-implemented method 600 for changing one or more parameters related to transmission of information based on automatic latency discovery and dynamic network selection in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system comprising a processor can convey a traceroute echo packet to a device via a defined radio access technology (e.g., via the transmitter/receiver component 110). The defined radio access technology can be a RAT for which a latency condition is to be analyzed.

Further, based on a reply received in response to the transmission of the traceroute echo packet, at 604 of the computer-implemented method 600, the system can determine a total latency of the traceroute echo packet (e.g., via the analysis component 112). The total latency can comprise a first time for transmission to the device and a second time for transmission from the device. The first time for transmission and the second time for transmission can be different times (e.g., are not symmetric). For example, the downlink might use a first route and the uplink might use a second route. For example, the first route can be via satellite and the second route can be via a cellular link. It is noted that although the downlink is discussed with respect to the first route, and the uplink with respect to the second route, the disclosed aspects are not limited to this implementation. Instead, the first route could be the uplink and the second route could be the downlink.

The computer-implemented method 600 also can comprise, at 606, comparing the total latency with a defined latency threshold (e.g., via the analysis component 112). At 608, a determination can be made related to whether the total latency satisfies a defined threshold (e.g., via the analysis component 112). For example, the defined threshold can be based on a service level agreement (e.g., between a network provider and a user). In another example, the defined threshold can be based on the type of service being provided (e.g., video, gaming, voice, and so on). Further, in some implementations, the defined threshold can be based on a current situation. For example, a defined threshold for transmission to various devices for emergency services or first responders can have a low latency requirement (e.g., should be quicker) as compared to the transmission for other devices (e.g., end user streaming a video).

If the determination is that the total latency satisfies the defined latency threshold ("YES"), at 610 of the computer-implemented method 600, the system can use the access technology defined in the message (e.g., the access technology for which the total latency was determined) for service to the specified device or to another device (e.g., via the transmitter/receiver component 110).

Alternatively, if the determination, at 608, is that the total latency does not satisfy the latency threshold ("NO"), at 612, another access technology, other than the defined access technology, can be used for communication with the specified device or another device (e.g., via the transmitter/receiver component 110).

Described herein are systems, methods, articles of manufacture, and other embodiments or implementations that can facilitate automatic latency discovery and dynamic network selection using data analytics in advanced networks with multiple transmission points. Facilitating automatic latency discovery and dynamic network selection using data analytics in advanced networks with multiple transmission points can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (cRAN) can enable the implementation of concepts such as SDN and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 7:
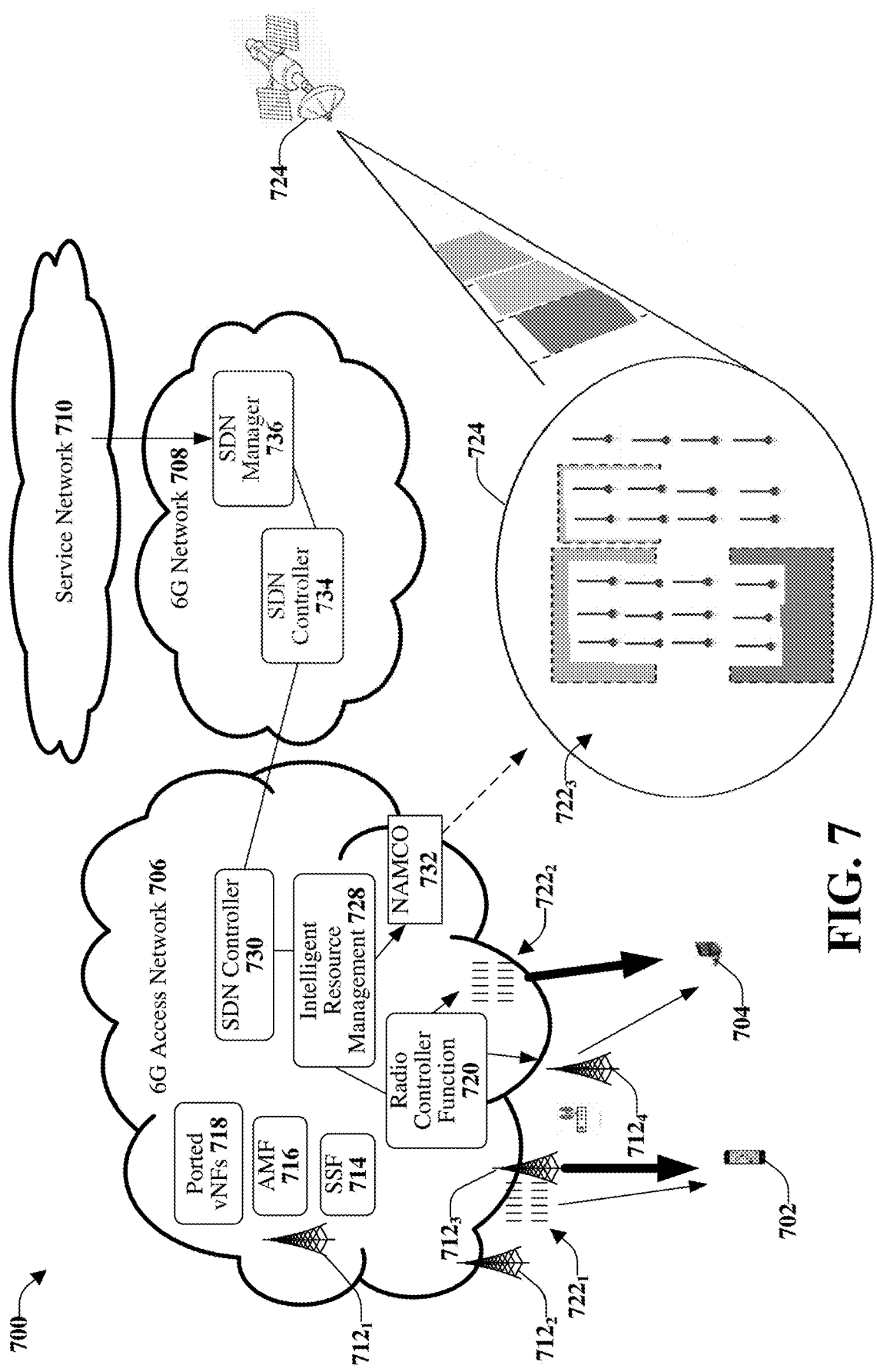
FIG. 7 illustrates an example, non-limiting, system for antenna farm intelligent software defined network enabled dynamic resource controller in advanced networks in accordance with one or more embodiments described herein.

Referring to FIG. 7, illustrated is an example, non-limiting, system 700 for antenna farm intelligent software defined network enabled dynamic resource controller in advanced networks in accordance with one or more embodiments described herein.

As illustrated one or more User Equipment devices (UEs), illustrated as a first UE 702 and a second UE 704, can be communicatively coupled to an access network (e.g., a 6G access network 706). The 6G access network 706 can be communicatively coupled to a 6G network 708 and associated service network 710. The one or more UEs (e.g., the first UE 702 and the second UE 704) can interface with the 6G access network 706 through respective base stations, a few of which are illustrated at base stations $712_1$, $712_2$, $712_3$, and $712_4$.

Included in the 6G access network 706 can be a Services Switching Function (SSF) device 714, an Access Management Function (AMF) device 716, one or more ported network functions virtualization (vNF) devices 718. Also included can be radio controller function device 720 that can communicate with one or more the base stations and/or one or more antenna farms, illustrated as a first antenna farm $722_1$ and a second antenna farm $722_2$. An exploded view of an antenna farm 724 is illustrated. The antenna farm 724 can communicate with one or more satellites 726 of a satellite network.

The radio controller function device 720 can also be communicatively coupled to an intelligent resource management device 728, a Software Defined Networking (SDN controller device 730), and a None Terrestrial Access Management Controller (NAMCO) device (e.g., a NAMCO device 732). Further, the 6G network 708 can comprise a SDN controller device 734 and an SDN manager device 736.

Figure 8:
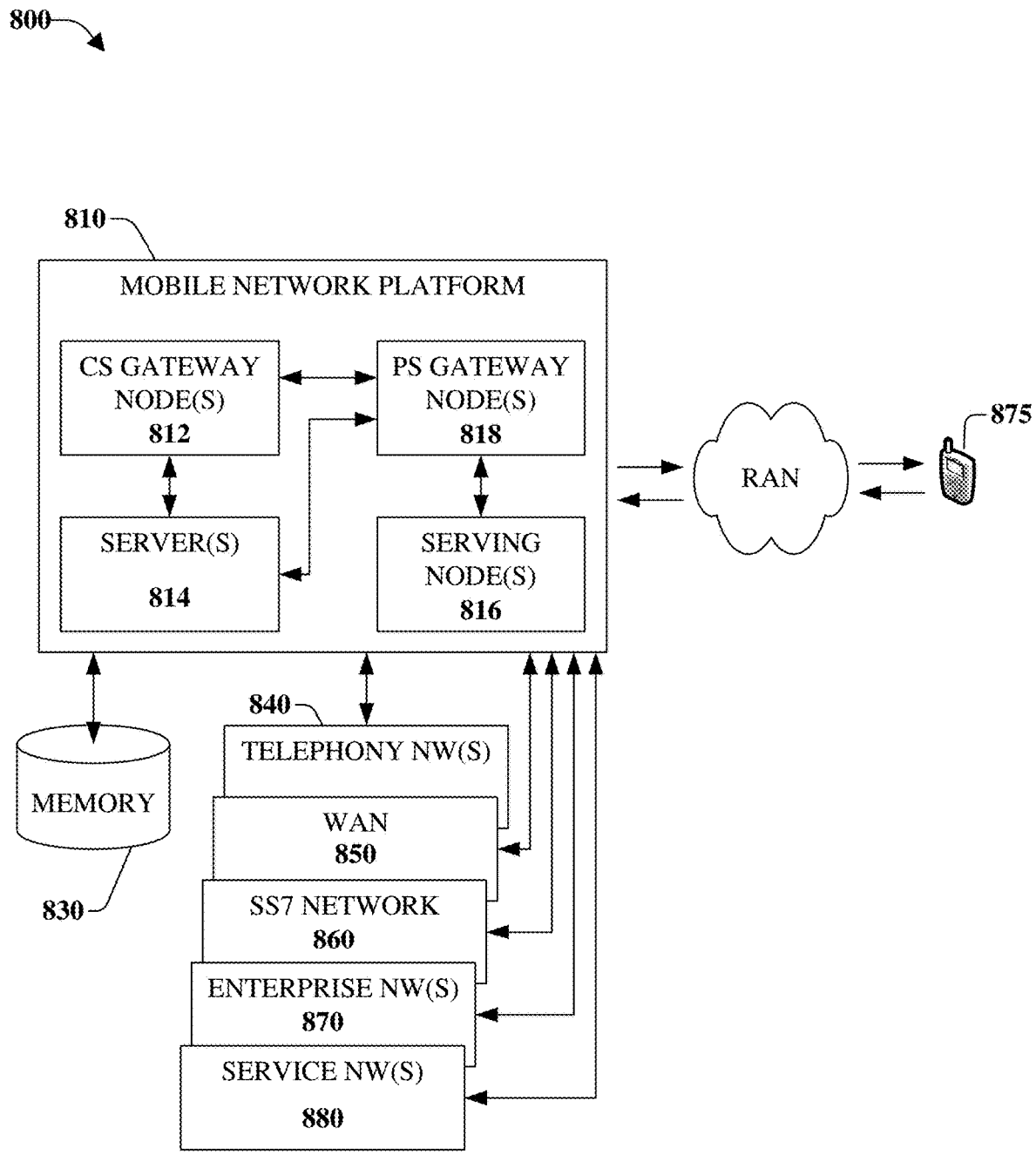
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
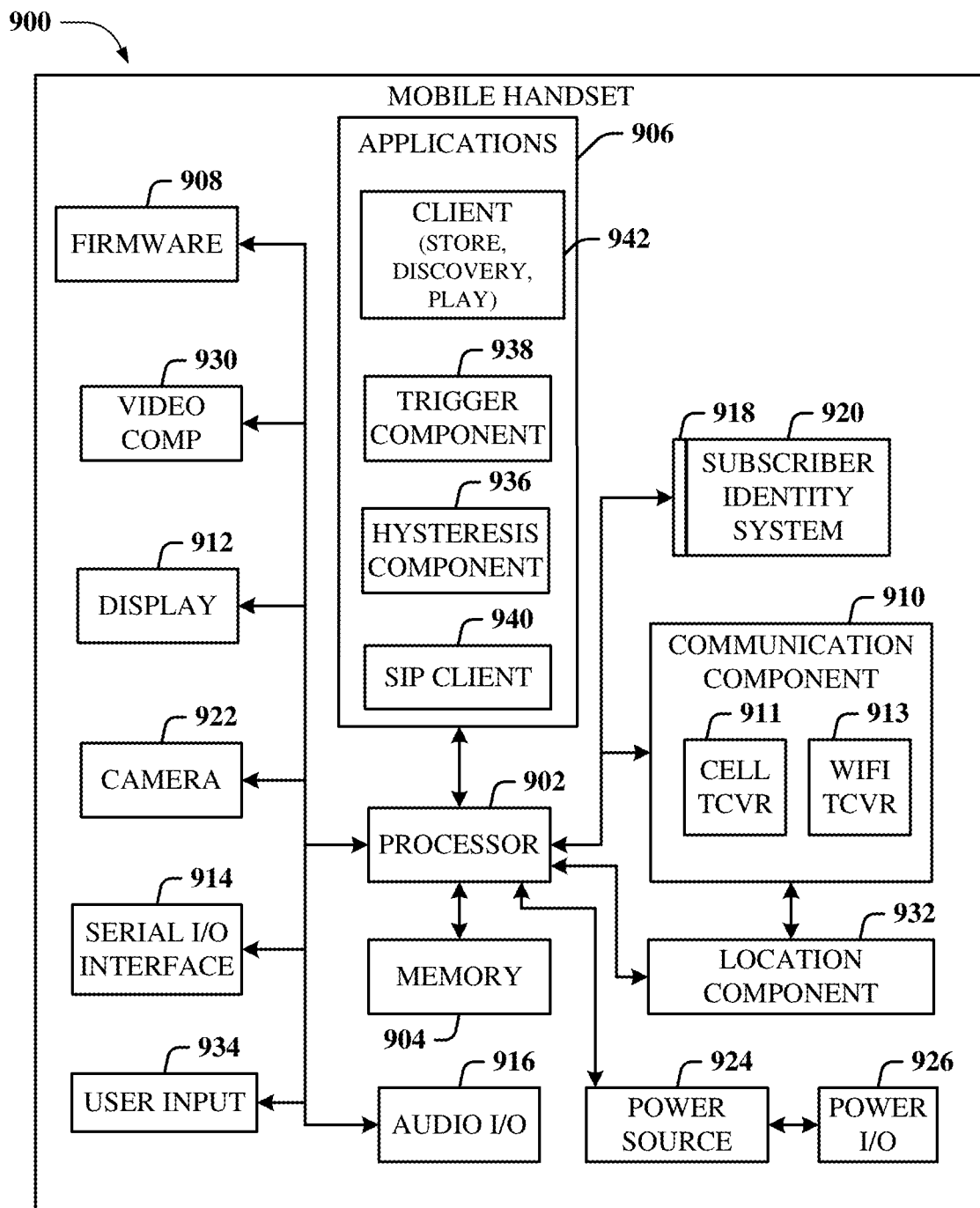
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
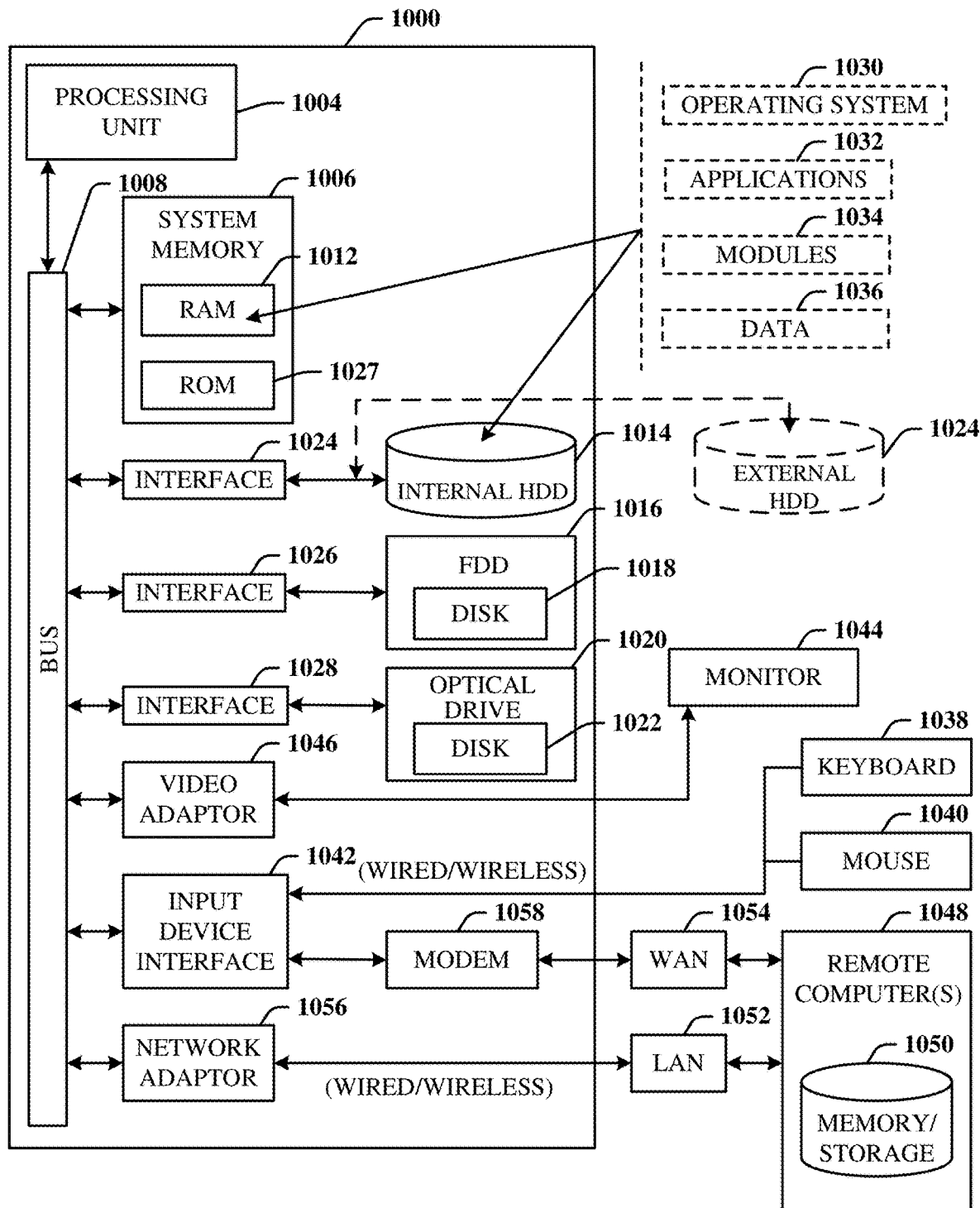
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random-access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. Network equipment, comprising:
   a processor; and
   a memory that stores executable instructions that, when executed by the processor, facilitate performance of operations, comprising:
      facilitating a transmission of a traceroute echo packet to a device via a defined first radio access technology, wherein the traceroute echo packet is an internet control message protocol echo packet, wherein the traceroute echo packet comprises a first timestamp field and a second timestamp field, and wherein the traceroute echo packet comprises a radio access technology field that comprises first information indicative of the defined first radio access technology over which a total latency is measured;
      based on a reply received in response to the transmission of the traceroute echo packet, determining the total latency of the traceroute echo packet;
      comparing the total latency with a service latency threshold of the defined first radio access technology; and
      based on a first determination that the total latency fails to satisfy a function of the service latency threshold, changing from the defined first radio access technology indicated in the first information to a defined second radio access technology for communication with the device.

2. The network equipment of claim 1, wherein the first timestamp field comprises second information indicative of a first time of the transmission of the traceroute echo packet, and wherein the second timestamp field comprises third information indicative of a second time of receipt of the traceroute echo packet at the device.

3. The network equipment of claim 2, wherein the determining of the total latency comprises determining the total latency based on the first timestamp field, the second timestamp field, and a time associated with receipt of the reply.

4. The network equipment of claim 1, wherein the total latency comprises an end-to-end delay measured for a downlink transmission and an uplink transmission.

5. The network equipment of claim 1, wherein the operations further comprise:
   based on a second determination that the total latency satisfies the function of the service latency threshold, continuing to use the defined first radio access technology.

6. The network equipment of claim 1, wherein the facilitating comprises facilitating the transmission of the traceroute echo packet via a downlink channel configured to operate according to a fifth generation wireless network communication protocol.

7. The network equipment of claim 1, wherein the facilitating comprises facilitating the transmission of the traceroute echo packet via an uplink channel configured to operate according to a fifth generation wireless network communication protocol.

8. A method, comprising:
   inserting, by a system comprising a processor, first information indicative of a first identified time into a first field of a message and second information into a radio access technology field of the message, wherein the second information is indicative of a first defined radio access technology over which an end-to-end latency is determined;

transmitting, by the system, the message to a specified device, wherein the message is transmitted as an internet control message protocol echo packet;

determining, by the system, the end-to-end latency for the message based on a response received from the specified device in reply to the message, wherein the response comprises third information indicative of a second identified time that the message was received at the specified device; and based on the end-to-end latency failing to satisfy a service latency threshold of the first defined radio access technology, switching from the first defined radio access technology to a second defined radio access technology for communication with the specified device.

9. The method of claim 8, further comprising:
determining, by the system, a downlink latency based on a difference between the second identified time and the first identified time.

10. The method of claim 8, further comprising:
determining, by the system, an uplink latency based on a difference between a received time of the reply and the second identified time.

11. The method of claim 8, further comprising:
based on the end-to-end latency satisfying the service latency threshold of the first defined radio access technology, continuing to use, by the system, the first defined radio access technology for communication with the specified device.

12. The method of claim 8, wherein the transmitting comprises transmitting the message via a downlink channel configured to operate according to a fifth generation wireless network communication protocol.

13. The method of claim 8, wherein the transmitting comprises transmitting the message via an uplink channel configured to operate according to a fifth generation wireless network communication protocol.

14. A non-transitory machine-readable medium, comprising executable instructions that, when executed by a processor, facilitate performance of operations, comprising:
conveying a traceroute echo packet to a device via a first radio access technology, wherein the traceroute echo packet is an internet control message protocol echo packet, wherein the traceroute echo packet comprises a first timestamp field and a second timestamp field, and wherein the traceroute echo packet comprises a radio access technology field that comprises first information indicative of the first radio access technology over which a total latency is measured;

based on a reply received in response to the conveying the traceroute echo packet, determining the total latency of the traceroute echo packet, wherein the total latency comprises a first time for transmission to the device and a second time for transmission from the device, and wherein the first time for transmission and the second time for transmission are different times; and based on a determination that the total latency fails to satisfy a service latency threshold condition associated with the first radio access technology, changing from the first radio access technology to a second radio access technology.

15. The non-transitory machine-readable medium of claim 14, wherein the operations further comprise:
comparing the total latency with a defined latency threshold; and
using the first radio access technology based on the total latency satisfying the defined latency threshold.

16. The non-transitory machine-readable medium of claim 14, wherein the determination is a first determination, and wherein the operations further comprise:
in response to a second determination that the total latency satisfies the service latency threshold condition associated with the first radio access technology, continuing to use the first radio access technology for communication with the device.

17. The non-transitory machine-readable storage medium of claim 14,
wherein the determining of the total latency comprises determining the total latency based on the first timestamp field, the second timestamp field, and a time associated with receipt of the reply.

18. The non-transitory machine-readable storage medium of claim 14, wherein the total latency comprises an end-to-end delay measured for a downlink transmission and an uplink transmission.

19. The non-transitory machine-readable storage medium of claim 14, wherein the conveying comprises facilitating a transmission of the traceroute echo packet via a downlink channel configured to operate according to a fifth generation network communication protocol.

20. The non-transitory machine-readable storage medium of claim 14, wherein the conveying comprises facilitating the transmission of the traceroute echo packet via an uplink channel configured to operate according to a fifth generation network communication protocol.

* * * * *